United States Patent [19]

Panush

[11] Patent Number: 5,049,442

[45] Date of Patent: Sep. 17, 1991

[54] OPALESCENT COATINGS CONTAINING FOAMED METAL OXIDES

[75] Inventor: Sol Panush, Farmington Hills, Mich.

[73] Assignee: BASF Corporation, Clifton, N.J.

[21] Appl. No.: 468,624

[22] Filed: Jan. 23, 1990

[51] Int. Cl.$^5$ .................. B32B 15/02; B32B 5/16; B32B 5/18

[52] U.S. Cl. .................. 428/328; 106/409; 106/410; 428/329; 428/690; 523/171

[58] Field of Search .............. 106/409, 410; 428/328, 428/329, 690; 523/171

[56] References Cited

U.S. PATENT DOCUMENTS

| | | | |
|---|---|---|---|
| 4,499,143 | 2/1985 | Panush | 428/336 |
| 4,539,258 | 9/1985 | Panush | 428/324 |
| 4,551,491 | 11/1985 | Panush | 524/31 |
| 4,598,015 | 7/1986 | Panush | 428/324 |
| 4,598,020 | 7/1986 | Panush | 428/411.1 |
| 4,605,687 | 8/1986 | Panush | 523/171 |
| 4,615,940 | 11/1985 | Panush et al. | 428/324 |
| 4,753,829 | 6/1988 | Panush | 427/385.5 |

OTHER PUBLICATIONS

Denton, E. J. et al., "Reflexion of Light by External Surfaces of the Herring, Clupea Harengus", *J. Mar. Biol. Assn.*, vol. 45, pp. 711–738 (1965).

Denton, E. J. et al., "Studies on Reflexion of Light from Silvery Surfaces of Fishes with Special Reference to the Bleak, Alburnus Alburnus", *J. Mar. Biol. Assn.*, vol. 45, pp. 683–703 (1965).

*Primary Examiner*—William J. Van Balen
*Attorney, Agent, or Firm*—Kenyon & Kenyon

[57] ABSTRACT

Novel opalescent coatings are disclosed containing foamed metal oxides. The foamed metal oxides impart a unique opalescence to the coatings, result in more natural hues, softer colors and minimal color travel.

14 Claims, No Drawings

OPALESCENT COATINGS CONTAINING FOAMED METAL OXIDES

This invention relates generally to opalescent coatings containing foamed metal oxides, processes for applying such coatings to articles, and articles coated with such coatings. More specifically, the coating compositions described herein are useful for coating autobody parts in the form of one-coat or multicoat systems.

BACKGROUND OF INVENTION

Automotive coating compositions exhibiting a metallic appearance are well known in the coatings art. The metallic appearance can be produced by using a metallic pigment such as metal flake in the coating composition. A metallic appearance can also be produced by the inclusion of metallic-like pigments such as metal oxide coated mica pigment in the coating composition, as disclosed in U.S. Pat. Nos. 4,499,143, 4,605,687, and 4,598,015, which are incorporated herein by reference.

Multicoat coating compositions comprising a pigmented basecoat and at least one clear topcoat are described in, for example, U.S. Pat. Nos. 4,705,839 and 4,791,168. The use of a basecoat-clear topcoat multicoat coating system results in improved aesthetic appearance along with improved resistance to weathering and damage.

In the one-coat system, no clearcoat or topcoat is applied. This more economical process is most useful on trucks, buses and fleet car body parts.

Automotive coating compositions exhibiting an opalescent color effect may be formulated using a three layer coating comprising first, a basecoat having an N-4 to N-8 value on the Munsell color chart, an interference or intermediary coating containing metal oxide encapsulated mica particles in a pigment to binder ratio of 0.06 to 0.13, and a third substantially clear outer topcoat. These opalescent coating systems are disclosed in U.S. Pat. Nos. 4,539,258 and 4,615,940 which are incorporated by reference. The application of three separate paint layers, however, makes the coating process complex and more expensive than the two coat process.

An opalescent color effect can be produced in a two-coat system using coating compositions comprising a thermoplastic or thermosetting resin, transparent metal oxide pigments having a particle size of about 20 nm to about 30 nm and metallic or metallic-like pigments. These opalescent coating compositions are exemplified in U.S. Pat. No. 4,753,829 which is incorporated by reference. However, the opalescence so produced exhibits a sharp and distinct color, having dramatic and unnatural complimentary color shifts and color travel.

Accordingly, there has been a need in the pigment art for simplified methods of producing opalescence which result in more natural hues, softer colors and minimal color travel.

SUMMARY OF THE INVENTION

It has been found that coating compositions comprising in part foamed metal oxides produce unique and novel opalescent color effects. This novel and unique opalescence features more natural hues, softer colors and minimal color travel on a soft patina background. These improved opalescent characteristics are in direct contrast to conventional opalescence which produces sharp-distinct colors with dramatic and unnatural complimentary color shifts and color travel.

Foamed metal oxides are described in, e.g., U.S. Pat. No. 3,497,455 and German Pat. No. 3909375. The use of foamed metal oxides in coating compositions together with metallic or metallic-like pigments and transparent organic or highly transparent inorganic pigments surprisingly produces opalescent color effects which are unexpected.

One aspect of the present invention involves coating compositions containing a foamed metal oxide in an amount effective to produce an opalescent color effect.

Another aspect of the present invention involves coated substrates comprising at least one layer of a coating composition containing a foamed metal oxide as described above.

Another aspect of the invention involves a method of coating a substrate with at least one layer of a coating composition containing a foamed metal oxide as described above.

Another aspect of the present invention involves an improved opalescent two-coat system wherein the first layer comprises a basecoat containing a foamed metal oxide, a metallic or metallic-like pigment and a substantially transparent organic or inorganic pigment. The second layer comprises a substantially transparent clearcoat. The two coat system has improved opalescence over other systems.

Another aspect of the present invention involves opalescent coatings that have much higher tint strength than coatings formulated without foamed metal oxides.

Still another aspect of the present invention involves the use of foamed metal oxides in opalescent coatings with improved face, flash and flop color effects.

DETAILED DESCRIPTION

The following terms are used throughout the specification claims, and have the meanings set forth below as will be understood by those skilled in the art:

hue: the color appearance of a pigment, based upon its overall light wavelength distribution, such as described in the IES Lighting Handbook (1981), pp. 5-1 to 5-13. The first dimension in color space.

value: lightness or darkness of a color; also referred to as "saturation." The second dimension in color space.

chromaticity: the third axis in color space. Hue, value, and chromaticity are used to define a color.

face: the color effect visible from a point perpendicular to the viewing surface.

flash: the color effect visible at about a 45 degree angle to the viewing surface.

flop: the color effect visible on an angle almost parallel to the viewing surface.

travel (color travel): difference in color observed at differing viewing angles.

undertone: the color observed when viewing an object at an angle which is different from the color observed when viewing perpendicular to the object.

p/b: pigment to binder ratio (w/w). The maximum p/b ratio for coating compositions is about 0.35.

While any substrate material can be coated with the coating composition according to the present invention, including but not limited to glass, ceramic, paper, wood, and even plastic material depending on the specific drying and/or curing requirements of the particular composition, the coating system of the present invention is particularly well suited for coating metal substrates, and specifically as an automotive paint finish system. The substrate may be a bare substrate material, or can be conventionally primed, for example to impart corrosion resistance. Examples of such metal substrates include steel, aluminum, copper, magnesium and alloys thereof. The components of the compositions can be varied to suit the temperature tolerance of the substrate material. For example, the components can be blended for air drying (i.e., ambient, low temperature cure (e.g., 150° F. to 180° F.), or high temperature cure (e.g., over 180° F.).

The pigment blend of the present invention can be used in pigmented topcoats, as single coat systems or as the basecoat of a basecoat/clear topcoat ("multicoat") composition. It is preferred to use the pigment of the present invention in a pigmented basecoat which is overcoated by a substantially clear topcoat. Although the pigmented basecoat/clear topcoat multicoat coating is preferred, it will be appreciated that the coatings described herein can have utility as pigmented topcoats, as pigmented coatings in general.

Suitable binder resins for these pigments include, for example, acrylic, urethane and polyester/polyurethane binders as disclosed in U.S. Pat. Nos. 4,487,869, 3,050,412, 3,198,759, 3,232,903, 3,255,135, 4,720,528, 4,705,839, 4,600,737, 4,423,179, 4,341,678, 4,318,833, 4,317,895, 4,794,147, and 4,791,168.

In the multicoat system described herein, a pigmented basecoat composition is applied to a substrate to protect the substrate surface, to hide blemishes and to provide an aesthetically pleasing color. It is typically followed by application of an unpigmented, substantially clear coating, which imparts a deep color appearance and durability to the pigmented basecoat. Other coating layers may then be applied if desired. Aesthetic quality is generally determined by the pigments in the basecoat.

The basecoat into which the pigment blend is incorporated may be a high solids content nonmetallic (metal free) basecoat which is designed for value (degree of darkness) and hue (undertone color). To produce the optimum in opalescence, the color value of the basecoat may be at specific values (N-4 to N-8) on the Munsell color chart. Preferably this value is N-5 to N-8 on the Munsell color chart and most preferably N-7.

The Munsell scale of value exhibits ten visually equal steps ranging between black (N-0) and white (N-10), the intermediate chips being dark to light grays. The Munsell value of a color is the same as that of the gray sample in the same row of the constant hue charts. Thus, the 7 in a red having the designation "5R 7/3" indicates a value in the pigment which is equal to the gray N-7.

The color imparted to the basecoat may also be coordinated with those contained in subsequently applied coatings to produce the opalescent color effect. The pigment is simply added to the topcoat in an amount which produces an N-4 to N-8 value on the Munsell color chart.

The hue of this basecoat can vary from yellow to blue as long as the Munsell value is essentially retained, and can be adjusted for a color value away from the gray to achieve a desired color sensation. This yellow to blue hue in this N-4 to N-8 value range can be produced using any conventional pigment blend known to produce such a color effect. Typically, the coloration is provided to the basecoat utilizing various combinations of transparent organic or inorganic pigments.

Each of the above-recited basecoat polymers may also be used in the topcoat, preferably in the form of a substantially transparent film, through which the basecoat pigments are visible. The topcoat is preferably substantially colorless, so that essentially the full polychromatic and aesthetic effect of the basecoat is realized. However, in some instances, desirable and unique styling effects can be obtained by the addition of contrasting or complementary colors to the topcoat.

Another outstanding feature of the topcoat is the significant improvement in the durability which is provided to the overall coating composition.

The multicoat system described herein may combine the desirable properties of a combination of resin systems. For example, in automotive finishes, the pigment control properties of polyurethane binders can be combined with the chemical resistance of a thermosetting acrylic clearcoat. This can be applied over a pigmented thermoplastic polyurethane basecoat. Likewise, in appliance finishes, the chemical resistance of polyester resins can be combined with the lower cost of thermosetting acrylic resins by applying a polyester clear topcoat over a pigmented thermosetting acrylic basecoat. Although any of the above-mentioned thermoplastic materials may be used to form the transparent topcoat, better durability is achieved if the topcoat is one of the above-cited thermosetting materials containing crosslinking agents.

These compositions may be also used as pigmented topcoats which exhibit opalescence and result in more natural hues, softer colors and minimal color travel. Any of the previously mentioned polymer systems for basecoats or clear topcoats may be used to form pigmented topcoats of the present invention.

The clear topcoat may serve to magnify any imperfections and highlight any color deficiencies in the basecoat. Hence, it is important to have a uniform pigment dispersion in the basecoat, and to achieve uniform application of the basecoat on the substrate. The clearcoat may also act as an ultraviolet magnifier, which can accelerate rather than retard ultraviolet light degradation of the pigment. Hence, U.V. absorbers may be included.

The foamed metal oxides useful in the present invention can be obtained, for example, from the Cabot Corporation, Boston Mass., and are sold as Foamed Titanium Oxide (Titania, 8903-15-HTI) and Foamed Aluminum Oxide (Alulite, 8903-26-HPLA). The particle size of these materials is typically 2-10 microns; the wall thickness is 5-15 nm; the pore size is 0.1-0.5 microns. The particles have an open pore-form structure and demonstrate high oil absorption. The foamed aluminum oxide typically has a surface area of 5-100 $m^2/g$ and the titanium oxide 20-80 $m^2/g$.

While the preferred foamed metal oxides are either foamed aluminum oxide or foamed titanium oxide, it is understood that other metal oxides may also be used. Representative metal oxides that fall into this category are the oxides of magnesium, iron, nickel, copper, zinc and the like.

The metallic pigments useful in the practice of the present invention include conventional metallic pigments such as metal flake, metal coated particles, and the like. It is particularly preferred to use commercially available aluminum flake pigments in the form of pigment pastes such as SS5242R manufactured by Silberline, OBP8187 manufactured by Obron, and 720AR manufactured by U.S. Bronze. In addition to aluminum flake, other metal flake compositions may be used such as bronze flake, stainless steel flake, and the like; silver flake, and other precious metal flakes.

The metallic-like pigments useful in the present invention may comprise metal oxide coated mica particles. The metal oxides used as coatings can comprise ferric oxide, titanium dioxide, chromium hydroxide and the like as well as combinations thereof. Commercially available metal oxide coated mica pigments include e.g., 9-504 manufactured by E. M. Chemicals and MEARL Exterior Russet manufactured by Mearl Corporation.

The coating compositions of the present invention may contain substantially transparent organic pigments such as perylenes, phthalocyanine blues and greens, quinacridones, imidazoles, benzimidazalones, as well as substantially transparent inorganic pigments, such as the transparent red and yellow iron oxides disclosed in U.S. Pat. No. 4,017,448, the teachings of which are incorporated herein by reference.

The coating compositions of the present invention when used as automotive paint coatings or other coatings will comprise quantities of the required components in amounts effective for creating an opalescent effect.

The amounts of each component with vary with the desired color effect of the dried or cured coating as well as the type of coating.

The pigment coating composition of the present invention typically has a pigment/base ratio of about 0.04 to 0.35 p/b, and the precise ratio is dependent upon the particular vehicle selected as well as the color desired. As such, the composition provides absolute hiding at about 0.5 to 1.5 mil coating thicknesses.

The amount of solvent in the coating composition will typically comprise about 10 wt. % to about 30 wt. %, depending on the enamel solids.

The amount of foamed metal oxide contained in the coating compositions of the present invention will typically comprise about 10 wt. % to about 80 wt. % of the total pigment weight. Preferably the amount of foamed metal oxide will comprise about 25 wt. % to about 70 wt. %, and ideally from about 40 wt. % to about 60 wt. %, of the total pigment weight.

The amount of metal or metallic-like pigment, such as coated mica, aluminum, etc., is controlled by the color desired in the finished enamel, and can vary from about 1 wt % to 99 wt % of the total pigment.

The amount of substantially transparent pigment contained in the coating composition of the present invention will typically comprise about 1 wt. % to about 99 wt. % of the total pigment composition preferably about 5 wt % to about 70 wt %, and most preferably about 10 wt % to about 50 wt %.

It should be noted that it is also preferred to add the foamed metal oxides as a pigment paste rather than as a dry pigment, to improve the rate of dispersability of the pigment in the coating and to produce a homogenous dispersion in the coating. A pigment paste will typically comprise about 10-15 parts of foamed metal oxide, about 40-55 parts of an appropriate resin and about 20-35 parts of a solvent compatible with the resin.

Small amounts of acid may also be added to initiate cross-linking when the coating is baked. One suitable acid is para toluenesulfonic acid. The acid is typically present in amounts of about 0.5-1.5 wt. % of the solid vehicle. Small quantities of UV absorbers may also be included to improve the ability of the cured film to withstand the detrimental effects of exposure to UV radiation over time. Typically about 0.25 to about 3.0 wt. % (based on solid vehicle) of a UV absorber such as Ciba-Geigy, Tinuvin 328 a substituted hydroxyphenyl benzotriazole, may be added.

The basecoat and the clear topcoat of the present invention can be applied to substrates by brushing, spraying, dipping, flow coating, etc. Typically, spray application is used for automotive coatings. Various types of spraying can be utilized such as compressed air spraying, electrostatic spraying, hot spraying techniques, airless spraying techniques etc. These applications can be performed manually or by using specially designed automated equipment such as robotic systems. Prior to application of the coating materials in automotive applications of the present invention, or when dealing with ferrous substrates, a corrosion-resistant primer is typically applied to the substrate. To this primed substrate is applied the basecoat. The primer coatings which can be used to coat substrates prior to the application of the coatings of the present invention include cured cathodic electrocoat primers such as the cross-linked amine-epoxy resin adducts disclosed in U.S. Pat. Nos. 4,575,224 and 4,575,523 which are incorporated by reference. Other types of primers include epoxies, acrylics, alkyds, polyurethanes, and polyesters applied by spraying, brushing and the like. The applied primer coating is typically about 0.5 mil to about 1.0 mil thick. The basecoat is typically applied to a thickness of about from about 0.4 mil to about 2.0 mils and preferably about 0.5 mil to about 0.8 mil. The basecoat thickness can be produced in a single pass or a plurality of passes with very brief drying ("flash") between applications of coats.

Once the basecoat has been applied, the substantially transparent overcoat is applied after allowing the basecoat to flash an ambient temperatures for about 30 seconds to about 10 minutes, preferably about 1 to about 3 minutes. While the basecoat can be dried for longer periods of time, even at higher temperatures, a much improved product is produced by application of the transparent topcoat after only a brief flash. Some drying out of the basecoat is usually necessary to prevent total mixing of the basecoat and topcoat. However, a minimal degree of basecoat-topcoat interaction is desirable for improved bonding of the coatings. The topcoat is also typically applied thicker than the basecoat (preferably about 1.8 to 2.3 mils) and can also be applied in a single or multiple pass.

Pigment control should be retained in the basecoat while it is being overcoated to produce the optimal aesthetic effect. Such control is evidenced by a lack of "strike-in" or migration of the two films (the basecoat and topcoat) into each other. When "strike-in" occurs, pigments move from the basecoat into the topcoat; the film compositions become intermixed at the interface and the baked coating composition has a dusty appearance rather than a clear "depth" appearance. Strike-in is prevented in the present invention by monitoring the process and by including additives in the basecoat such as cellulose acetate butyrate, microgels, and high molecular weight monomers. However, sufficient wetting at the interface is preferred to assure that delamination and solvent release from either coating do not occur to any substantial degree.

Once the topcoat is applied, the system is again flashed for 30 seconds to 10 minutes and the substrate is bake at a temperature sufficient to drive off the solvent in the case of thermoplastic layers and at a temperature sufficient to cure and cross-link in the case of thermosetting layers. These temperatures can range anywhere from ambient temperature to about 400° F. Typically in the case of thermosetting material, temperatures of about 225° F. to 250° F. are used for about 30 minutes.

It will be appreciated by those skilled in the art that the coatings of the present invention may be applied by printing, non-automotive coating applications, container coating and the like. Coating thicknesses and curing or drying mechanisms will similarly vary with the method of application.

The foamed metal oxide-containing coating exhibits surprisingly and unexpectedly, an opalescent color effect which results in more natural hues, softer colors and minimal color travel on a soft patina background. It is believed that the open pore structure of the foamed metal oxide pigment combined with its transparency results in a unique scattering of the incident and reflected light, and that the incident and reflected the light interacts with light reflected from the metallic or metallic-like pigments and the transparent organic or inorganic pigments. This produces improved opalescence over the coatings of the prior art.

Foamed aluminum oxide and foamed titanium oxide typically produce the following results with respect to the opalescent color appearance:

Foamed Aluminum Oxide

Face: soft-bright; slight blue hue
Flash: soft yellow
Flop: light and opaque with blue hue Foamed Titanium Oxide Face: soft-light-bright with slight blue hue
Flash: gray-yellow ceramic appearance
Flop: blue hue, very light and opaque, nonmetallic appearance The following examples are illustrative of the principles and practice of this invention although not limited thereto. Parts and percentages are expressed in weight.

| Examples: | Pigment Compositions | | | | | |
|---|---|---|---|---|---|---|
| | 1A | 1T | 2A | 2T | 3A | 3T |
| (1) | 10.00 | 10.00 | — | — | — | — |
| (2) | — | — | 10.00 | 10.00 | — | — |
| (3) | — | — | — | — | 10.00 | 10.00 |
| Foamed Aluminum Oxide | 45.00 | — | 45.00 | — | 45.00 | — |
| Foamed Titanium Oxide | — | 45.00 | — | 45.00 | — | 45.00 |
| Aluminum (4) | 45.00 | 45.00 | 45.00 | 45.00 | 45.00 | 45.00 |

Notes
(1) Green shade phthalocyanine Blue (Ciba-Geigy X3485)
(2) Red shade phthalocyanine blue (Mobay B4714)
(3) Extra yellow shade phthalocyanine green (Sun Chemical 264-4444)
(4) Silberline Aluminum Using these pigment compositions the following results were obtained. In all the examples the 10% color level yields a two to three hundred percent increase in tint strength when compared to enamels without the foamed oxides.

Foamed aluminum oxide

* Face: Equal specular reflectance, clean rich color highlighting the undertone of the colored pigment
Example 1A: Green
Example 2A: Red
Example 3A: yellow

* Flash: Equal specular reflectance with a slight opalescent (gray - opaque color).
* Flop: Opaque - ceramic appearance high lighting the undertone color yielding
Example 1A: rich green-blue
Example 2A: rich red-blue
Example 3A: rich yellow-green Foamed titanium oxide

* Face: Soft-satin patina yielding a subtle tarnished appearance that highlights the undertone of the colored pigment
Example 1T: turquoise
Example 2T: royal blue
Example 3T: lime green

* Flash: Very soft-ceramic patina producing opalescence
Example 1T: soft yellow/gray/green,
Example 2T: rich red/gray/blue
Example 3T: rich yellow/gray/green.

* Flop: Very light non-metallic appearance in a soft-antique patina yielding total color value and aesthetics of the colored pigment
Example 1T: green/blue
Example 2T: red/blue
Example 3T: yellow/green The vehicle composition (in wt. %) in which the above foamed oxides were evaluated was:

| 1: Basecoat | | acrylic high solids |
|---|---|---|
| 15.00 | 20.00 | Microgel (BASF) |
| 35.00 | 40.00 | Resimene X755 (Monsanto) |
| 50.00 | 40.00 | Acrylic resin (BASF) |
| * | | Didodecyl benzene sulfonic acid catalyst (King Ind.) (0.5-2.5% on S.V.). |
| * | | Tinuvin 328 (Ciba Geigy). 30% in xylene (0.5% to 3.0% on S.V.). |
| 100.00 | 100.00 | |

| 2: Clearcoat | acrylic high solids |
|---|---|
| 34.62 | Resimene X755 (MONSANTO) |
| 60.58 | Acrylic Resin (BASF) |
| 1.50 | Tinuvin 1130 (CIBA GEIGY) U.V. Absorber |
| 1.10 | Tinuvin 900 (CIBA GEIGY) U.V. Absorber |
| 0.95 | XP-243 Acid Catalyst |
| 0.90 | Tinuvin 440 (CIBA GEIGY) U.V. Absorber |
| 0.35 | DUPONT CH5967, polybutylacrylate |
| 100.00 | |

A 1000 pound batch of enamel containing foamed metal oxides would be prepared as follows:

(1) Thoroughly mix, with sufficient agitation to stabilize the blend, 28.07 lbs acrylic resin, 339.60, lbs blue tint paste, and 241.21 lbs metal oxide paste.

(2) Separately mix together 36.70 lbs aluminum flake (PZ2180) and 25.00 lbs xylene (SR0708).

(3) Add mixture (2) to mixture (1)

(4) Separately mix together and stir for 15 minutes 31.70 lbs Tinuvin 328 solution (30% in xylene), 9.50 pounds acid catalyst (DS 2075), 2.39 lbs butyl cellosolve and 14.00 lbs xylene.

(5) Add mixture (4) to mixture (3)

(6) Adjust for color and viscosity, check nonvolatiles, weight per gallons and v.o.c.

These colors can be produced in either a single coat or a multi-coat system. The preferred system is a two coat system in which all the pigments are blended into the basecoat. This basecoat is applied over a primed substrate, and is evenly overcoated with a nearly transparent topcoat. This preferred two coat system can be applied either as a double bake system, wherein each coating is baked after it is applied, or as a single bake system, wherein the topcoat is applied using a wet-on-wet process. Both coatings are then baked using the single bake system. The most preferred system is a two-coat, single-bake (wet-on-wet) application.

Other systems using either basecoat/clearcoat or the one pack coating system that are applicable to these unique opalescent color effects include water-borne systems; polyester/polyurethane systems; low solids systems, such as alkyd basecoat and acrylic clearcoat (solution or dispersion) lacquers; and urethanes or acrylics in both the basecoat and clearcoat.

Chromaticity was determined through visual evaluation by a skilled observer determining the purity of the color with reference to a Munsell color standard. The purity or chromaticity was related to the Munsell reference by the perception of various degrees of contamination with white or black tones.

Although this invention has been shown and described with respect to certain preferred embodiments thereof, it will be understood by those skilled in the art that various changes in form and detail may be made without departing from the spirit and scope of this claimed invention.

I claim:

1. A coating composition containing a pigment blend comprised of foamed metal oxide, a metallic or metallic-like pigment and a transparent organic or transparent inorganic pigment, wherein the quantity of said foamed metal oxide is effective for producing an opalescent color effect when said coating composition is applied to a substrate.

2. A coating composition as described in claim 1 wherein said foamed metal oxide is selected from the group consisting of foamed titanium oxide and foamed aluminum oxide.

3. A coating composition as described in claim 2 wherein said foamed titanium oxide or foamed aluminum metal oxide comprises from about 10 to about 80% of the pigment blend.

4. A coating composition as described in claim 3 wherein the quantity of said foamed titanium oxide or foamed aluminum oxide comprises from about 25 to about 70% of the pigment blend.

5. A coating composition as described in claim 4 wherein said foamed titanium oxide or foamed aluminum oxide comprises from about 40 to 60% of the pigment and blend.

6. A coating composition as described in claim 1 wherein said foamed metal oxide is in the form of particles having a size of from about two microns to about ten microns, said particles further having an open pore-foam structure, with walls between the pores of said open pore-foam structure, said walls having a wall thickness of about 5 nm to about 15 nm and a pore diameter of about 0.1 microns to about 0.5 microns.

7. A coating composition as described in claim 6 wherein said foamed metal oxide comprises a foamed aluminum oxide in the form of particles having an open pore-foam structure and a surface area of about 5 to about 100 $m^2/g$.

8. A coating composition as described in claim 6 wherein said foamed metal oxide comprises a foamed titanium oxide in the form of particles having an open pore-foam structure and a surface area of about 20 to about 80 $m^2/g$.

9. A coating composition as described in claim 1 wherein said transparent organic pigment is selected from the group consisting of phthalocyanine blues, phthalocyanine greens, perylenes, quinacridones, imidazoles and benzimidazalones.

10. A coating composition as described in claim 1 wherein said transparent inorganic pigment is selected from the group consisting of transparent red iron oxide and yellow iron oxide.

11. A substrate coated with a coating composition as described in claim 1.

12. A substrate coated with at least one layer of a coating composition containing a foamed metal oxide, a metallic or metallic-like pigment and a transparent organic or inorganic pigment, wherein the quantity of said foamed metal oxide is effective for producing an opalescent color effect on the substrate.

13. A substrate as described in claim 12 wherein said substrate is coated with a first layer and a second layer, said first layer being a basecoat containing said foamed metal oxide, a metallic or metallic-like pigment and a transparent organic or inorganic pigment, and the second layer is a clearcoat applied over said basecoat.

14. A method for producing a coated substrate having an opalescent effect comprising applying to the substrate a coating composition containing a foamed metal oxide, a metallic or metallic-like pigment and a transparent organic or inorganic pigment, and wherein the quantity of said foamed metal oxide is effective for producing an opalescent color effect.

* * * * *